(12) United States Patent
Adam et al.

(10) Patent No.: US 11,668,346 B2
(45) Date of Patent: Jun. 6, 2023

(54) ANTI-FRICTION LACQUER AND SLIDING ELEMENT HAVING SUCH AN ANTI-FRICTION LACQUER

(71) Applicant: FEDERAL-MOGUL WIESBADEN GMBH, Wiesbaden (DE)

(72) Inventors: Achim Adam, Nauheim (DE); Joachim Schluter, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 17/931,622

(22) Filed: Sep. 13, 2022

(65) Prior Publication Data
US 2023/0003254 A1    Jan. 5, 2023

Related U.S. Application Data

(62) Division of application No. 16/646,775, filed as application No. PCT/EP2018/074101 on Sep. 7, 2018, now Pat. No. 11,466,732.

(30) Foreign Application Priority Data

Sep. 12, 2017  (DE) ................. 10 2017 216 110.8

(51) Int. Cl.
| | | |
|---|---|---|
| *F16C 33/10* | (2006.01) | |
| *C09D 7/61* | (2018.01) | |
| *C09D 179/08* | (2006.01) | |
| *F16C 33/12* | (2006.01) | |
| *C09D 7/40* | (2018.01) | |

(Continued)

(52) U.S. Cl.
CPC ............ *F16C 33/1095* (2013.01); *C09D 7/61* (2018.01); *C09D 179/08* (2013.01); *F16C 33/125* (2013.01); *F16C 33/127* (2013.01); *C08K 3/08* (2013.01); *C08K 3/22* (2013.01); *C08K 3/34* (2013.01); *C08K 2003/3009* (2013.01); *C08K 2003/385* (2013.01); *C09D 5/38* (2013.01); *C09D 7/68* (2018.01); *C09D 7/69* (2018.01); *C10M 125/10* (2013.01); *C10M 125/20* (2013.01); *C10M 125/22* (2013.01); *C10M 125/26* (2013.01); *C10N 2040/02* (2013.01);

(Continued)

(58) Field of Classification Search
CPC .. F16C 33/1095; F16C 33/124; F16C 33/125; F16C 33/127; F16C 33/20; F16C 33/201; F16C 33/203; F16C 33/205; F16C 33/206; F16C 33/208; F16C 2204/60; F16C 2223/30; F16C 2240/48; C08K 3/08; C08K 3/22; C08K 3/34; C08K 2003/3009; C08K 2003/385; C09D 5/38; C09D 7/61; C09D 7/68; C09D 7/69; C09D 179/08; C10M 125/10; C10M 125/20; C10M 125/22; C10M 125/26; C10N 2040/02

See application file for complete search history.

(56) References Cited

FOREIGN PATENT DOCUMENTS

DE      102011089975 B3  *  4/2013  .......... F16C 33/1095

* cited by examiner

*Primary Examiner* — Phillip A Johnson
(74) *Attorney, Agent, or Firm* — Robert L. Stearns; Dickinson Wright, PLLC

(57) ABSTRACT

An anti-friction lacquer has a resin matrix of a polymer and functional fillers containing mixed-phase oxides having a specified grinding hardness and proportion and optionally contain further functional fillers. A sliding element is also disclosed having a metallic substrate layer and a coating applied to the substrate that is made of at least in part of the anti-friction.

18 Claims, 1 Drawing Sheet

(51) Int. Cl.
*C08K 3/34* (2006.01)
*C10M 125/22* (2006.01)
*C10M 125/10* (2006.01)
*C10M 125/20* (2006.01)
*C10N 40/02* (2006.01)
*C09D 5/38* (2006.01)
*C08K 3/08* (2006.01)
*C08K 3/38* (2006.01)
*C08K 3/22* (2006.01)
*C08K 3/30* (2006.01)
*C10M 125/26* (2006.01)

(52) U.S. Cl.
CPC ...... *F16C 2204/60* (2013.01); *F16C 2223/30* (2013.01); *F16C 2240/48* (2013.01)

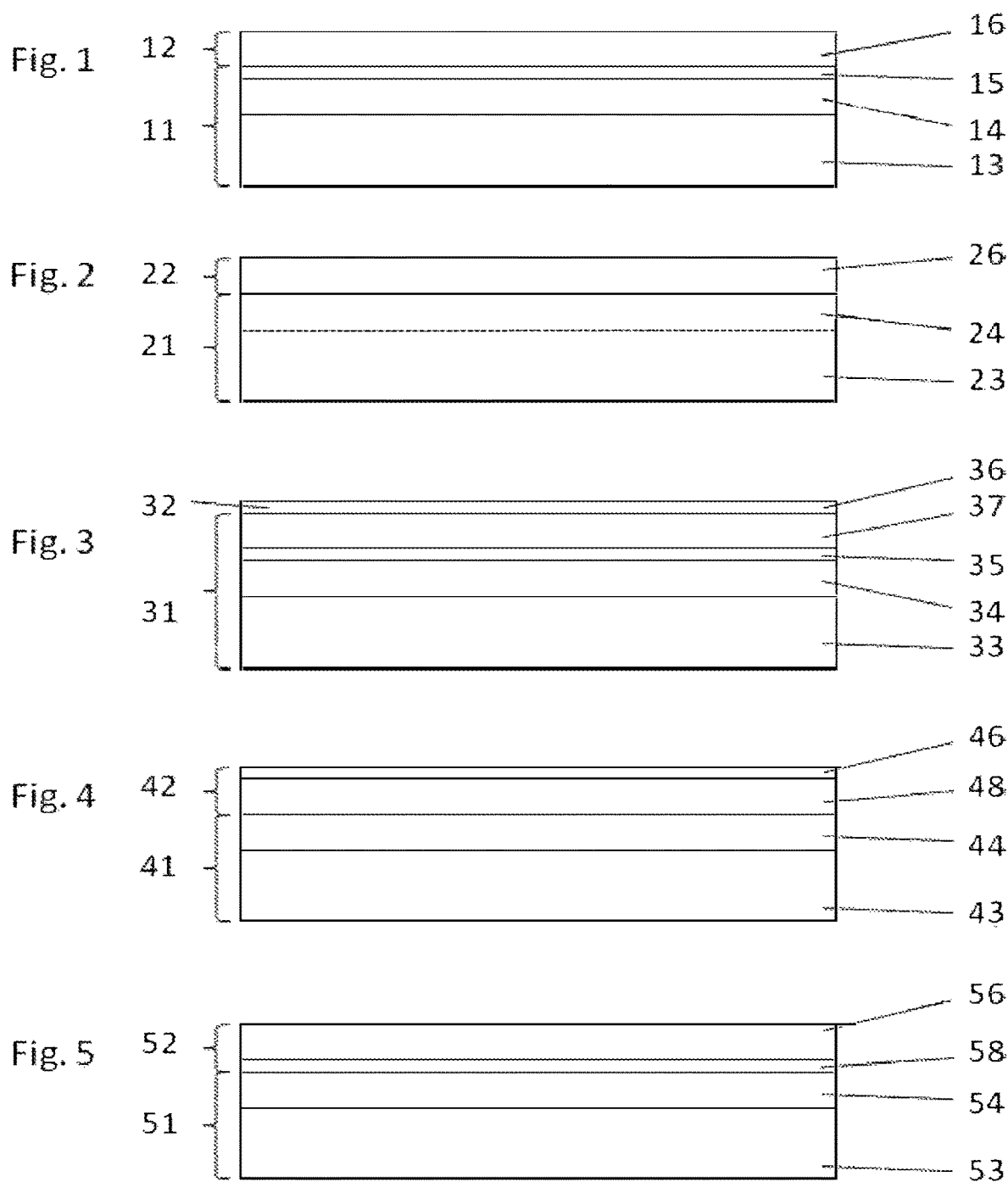

ANTI-FRICTION LACQUER AND SLIDING ELEMENT HAVING SUCH AN ANTI-FRICTION LACQUER

CROSS-REFERENCE TO RELATED APPLICATION

This U.S. Divisional Patent Application claims priority to U.S. Utility patent application Ser. No. 16/646,775, filed Mar. 12, 2020, which claims priority to International Patent Application No. PCT/EP2018/074101, filed Sep. 7, 2018, which claims priority to German Patent Application No. 10 2017 216 110.8, filed Sep. 12, 2017, the entire contents of each which are incorporated herein by reference.

BACKGROUND OF THE INVENTION

1. Technical Field

This invention relates generally to sliding elements for engines (e.g., bearings) and more particularly to those modified for anti-friction properties.

2. Related Art

Sliding elements in engines in most cases comprise multi-layered materials with specially modified surfaces, which optimise the sliding properties. Generally, the surfaces of sliding bearings are metal layers, for instance, based on lead, tin or aluminium, which are applied by means of galvanic processes, vaporisation or mechanical plating.

Non-metal layers based on synthetic resin are also known, so-called anti-friction lacquers, which are modified in terms of their sliding properties, durability and wear resistance by adding fillers.

Sliding coatings based on synthetic resin have been used for many years as an auxiliary agent to reduce the friction quite generally in mechanical constructions. Generally, there are coated metal, plastics material and rubber components which permanently have to be able to be readily moved without further lubrication. In typical applications, the loads are rather small and the peripheral conditions, such as temperature or media, are non-critical.

From different patent applications, such as, for example, EP 0 984 182 A1 and the first commercially available plain bearing products, applications in the engine, for example, for the crankshaft bearing, are also already known. There is generally mentioned as a substrate the known range of copper and aluminium alloys, the lacquer matrix comprises polyamideimide (PAI), polyimide (PI), epoxy and phenol resin, polybenzimidazole (PBI) or polyetheretherketone (PEEK). For example, reference may be made to the document EP 1 775 487 A1. In order to improve sliding properties and durability, the matrix plastics material is filled with functional fillers, such as solid lubricants, for example, $MoS_2$, $WS_2$, BN, PTFE, ceramic powders, for example, oxides, nitrides, carbides, silicates, metals, for example, Al, Cu, Ag, W, Ni, Au, see, for example, WO 2004/002673 A1. Other fillers, such as ZnS or $BaSO_4$ are mentioned in the document WO 2015097159 A1.

The application of the layer is carried out by means of spraying or pressing methods and subsequent thermal curing.

From DE 10 2013 202 123 B3 a metal/plastics material plain bearing composite material is known having a metal support layer and a porous carrier layer. The pores of the carrier layer are filled by a sliding layer material based on fluorine-free thermoplastics and fillers which improve the tribological properties.

Nevertheless, the known coatings have under inadequate lubrication conditions at high speeds a rate of wear, via which the layer becomes completely worn when this state occurs more frequently. This may, particularly with substrate materials with limited sliding properties, which is generally the case with copper-based bearing metals, lead to the complete failure of the bearing as a result of fretting.

In the document WO 2010076306, the use of iron (III) oxide as a functional filler is proposed in order to counteract this. In fact, as a result of the finely distributed oxide, an improved wear resistance can be achieved, which is advantageous particularly with engines during start/stop operation, with additional loads of the crankshaft by belt drives and in shafts with a higher degree of roughness. At high speeds, inadequate lubrication states and the need for adaptation as a result of geometric deviations of the shape of the bearing and counter-rotation member, or in the event of edge loads as a result of tilting positions, however, friction-related local heating of the shaft journal and subsequently thermal weakening of the polymer matrix may occur, which can lead to failure of the layer and again to fretting on the substrate material.

BRIEF SUMMARY OF THE INVENTION

An object of the invention is accordingly to provide an anti-friction lacquer with a low wear rate, which nonetheless even in critical lubrication states, where there is a need for adaptation and at high speeds has sufficient emergency running properties so that a local failure of the layer is prevented.

The anti-friction lacquer according to the invention has a polymer as a resin matrix and functional fillers, wherein the functional fillers contain mixed-phase oxides and optionally additional functional fillers.

The sliding element according to the invention has a metal substrate layer and a coating which is applied thereto and which comprises at least one anti-friction lacquer having these features.

The anti-friction lacquer according to the invention is accordingly preferably suitable as a coating for a plain bearing having a metal substrate layer. A particularly preferred application is the coating of a bearing shell or bush in an internal combustion engine, in particular as a crankshaft main bearing or connection rod bearing. This application places particularly high demands on the durability of the lacquer and the metal substrate.

The invention further relates to a method for producing a sliding element. The method involves providing a metal substrate layer, applying the anti-friction lacquer dissolved in a solvent to the substrate layer and curing the anti-friction lacquer. As a result of the curing of the anti-friction lacquer on the substrate layer, a coating is formed on the substrate layer.

The curing of the anti-friction lacquer preferably involves cross-linking of the polymer and a (generally simultaneous) extraction of the solvent. In particular, a thermally curable anti-friction lacquer may be used. The curing can then take place with the anti-friction lacquer being heated. As a result of the heat acting on the anti-friction lacquer, on the one hand, the extraction of the solvent can be influenced. On the other hand, the heat supply can promote the cross-linking process of thermally curable anti-friction lacquers.

"Mixed-phase oxides" are intended to be understood to be fine-particle mixed-phase oxides which are also referred to as mixed-phase oxide pigments. The term "anti-friction lacquer" is in this instance used to refer to the completely cured anti-friction lacquer without solvent.

The inventors, in analysing the cases in which iron (III) oxide is used as a functional filler, have determined that it may be disadvantageous for the wear resistance to be excessively high since this increases the duration of the adaptation processes and the resultant local heating. Therefore, the invention makes provision for the wear resistance of the anti-friction lacquer to be modified in such a manner that slightly more adaptation wear is possible in favour of a lower level of heating.

The document EP 2 563 590 A1 describes the use of mixed-phase oxide pigments in sliding layers of plain bearing composite materials which have a porous substructure, for example, of bronze, in which a polymer sliding layer material based on fluoropolymer, in particular PTFE, is impregnated. The sliding layer material comprises up to at least 60% by vol. fluoropolymers and further has at least 5% by vol. hexagonal boron nitride. After a run-in phase, with such sliding layers, the bronze on the contact face is exposed and forms the carrying surface. In the run-in phase, the mixed-phase oxide pigments together with the hexagonal boron nitride are intended to increase the wear resistance.

Therefore, these sliding layers are not formed from anti-friction lacquers in the same manner as the layers known from DE 10 2013 202 123 B3. They are used primarily for non-lubricated or slightly lubricated applications. However, bearings having such sliding layers cannot solve the problem set since they are generally unsuitable for use on the crankshaft in internal combustion engines. The porous substrate does not have sufficient fatigue resistance for this purpose and the sliding layer material alone does not have sufficient durability. Therefore, the lacquer with the sliding element is applied not to a porous sintered layer, but instead preferably to a solid metal substrate layer, a so-called solid material, or with a composite material to a metal substrate layer which has been roll-bonded, cast or deposited galvanically or by means of physical vapour deposition (VPD).

The mixed-phase oxides in the anti-friction lacquer according to the invention are, on the one hand, hard enough to achieve a wear-reducing effect in the surface. They are therefore suitable for replacing the iron (III) oxide which is known to be used for this purpose. However, they are not so hard that, as a result of mechanical interaction, the shaft surface can be processed, that is to say, smoothed or removed, whilst iron (III) oxide is just so hard that it is even suitable for polishing steel. It is therefore assumed that, as a result of the lower level of hardness of the mixed-phase oxides in the anti-friction lacquer according to the invention, no such high level of friction energy is introduced into the system comprising the plain bearing and counter-movement member as, for example, when iron (III) oxide is used so that the anti-friction lacquer coating may be somewhat less wear-resistant but withstands short inadequate lubrication states for longer, even at a very high speed. The Rosiwal grinding hardness of the mixed-phase oxides should consequently preferably be less than that of iron (III) oxide, that is to say, below 55, in order to minimise the energy input into the counter-movement member.

It was established that the peak load capacity of crankshaft bearings with the use of the anti-friction lacquer according to the invention could be increased up to 120 MPa, a value which otherwise is achieved only by aluminium-based sputter layers.

The service-life under inadequate lubrication conditions was more than tripled compared with coatings with harder oxides.

Preferably, the mixed-phase oxides are contained at a proportion of from 0.1 to 15% by vol., in a particularly preferred manner from 0.5 to 8% by vol. with respect to the cured anti-friction lacquer.

In the same manner as "anti-friction lacquer", the terms "cured anti-friction lacquer" or "cured anti-friction lacquer layer" refer herein to the anti-friction lacquer or the layer formed therefrom after curing without taking into account the solvent.

With smaller proportions than 0.1% by vol. no improvement with regard to the wear resistance can be determined. Proportions of above 15% by vol. lead to a weakening of the matrix of the anti-friction lacquer. In a particularly preferred manner, the mixed-phase oxides are for these reasons contained at a proportion of from 0.5 to 8% by vol. with respect to the cured anti-friction lacquer.

Mixed-phase oxides are not mixtures of oxides, but instead oxides in which specific crystal grid locations are occupied by the different metal ions. The mixed-phase oxides preferably contain at least two of the elements titanium, cobalt aluminium, nickel, antimony, chromium, iron or zinc.

In a particularly preferred manner, the mixed-phase oxides are formed from titanium and at least two of the elements cobalt, aluminium, nickel, antimony, chromium, iron or zinc.

In a quite particularly preferred manner, the mixed-phase oxides are Co—Al oxide, Ni—Sb—Ti oxide, Fe—Al oxide and Co—Ti—Ni—Zn oxide.

The mixed-phase oxides are preferably in the form of rutile, spinel or hematite structures. It has been found that in particular finely distributed rutile mixed-phase oxides comply with the requirements with respect to wear resistance and dry running since their hardness is slightly below that of the steel.

It has been found to be advantageous for the mixed-phase oxides to have a mean particle size in the form of the D50 value in the range from 0.05 to 2.0 µm, in a particularly preferred manner from 0.1 to 0.5 µm.

In order to adapt the layer properties of the anti-friction lacquer to the objective in the respective application, said additional functional fillers are used. All functional fillers, in particular therefore also the mixed-phase oxides, are present in the most uniformly dispersed manner possible in the anti-friction lacquer.

Preferably, the functional fillers optionally contain one or more of the materials solid lubricants, hard materials and materials which improve the thermal conductivity or which influence the cross-linking of the lacquer surface.

The addition of solid lubricants improves the emergency running properties, that is to say, the behaviour during non-hydrodynamic operating states. In order to reduce wear or condition a shaft, relatively small quantities of additional hard materials (hard substances) are used and materials which improve the thermal conductivity serve to rapidly remove friction heat and consequently the permanent durability.

Preferably, metal sulphides having a layered structure such as $MoS_2$, $WS_2$, $SnS_2$, graphite, hexagonal BN, polytetrafluoroethylene (PTFE) or $ZnS/BaSO_4$ admixtures are used as solid lubricants.

Preferably, nitrides, carbides, borides, oxides, for example, SiC, $Si_3N_4$, $B_4C_3$, cubic BN or $SiO_2$, are used as hard materials.

One or more metal powders, particularly comprising Ag, Pb, Au, Sn, Al, Bi or Cu are preferably contained as materials which improve the thermal conductivity.

The cross-linking and surface properties can be influenced by very fine-grained fillers, such as, for example, $Fe_2O_3$ or $TiO_2$ or the mixed oxides thereof.

The total quantity of all functional additives including the mixed-phase oxide is intended to be selected in such a manner that the total volume proportion thereof does not exceed 75% of the cured anti-friction lacquer. In this instance, the volume proportion of the hard materials is preferably not greater than 10%, in a particularly preferred manner not greater than 5% by vol. and that of the metal powder is not greater than 30%.

Larger mechanically resistant material proportions worsen the sliding properties and act in an abrasive manner on the shaft running surface. Larger metal proportions are difficult to disperse and are therefore poor in terms of the processing properties.

The polymer is preferably selected from the group comprising polyimides (PI), polyamideimides (PAI), polyetherimides (PEI) and polyesterimide, epoxy resins (EP), phenol resin, polybenzimidazole (PBI), silicone resins, refractory thermoplastics, in particular having a melting point above 220° C., polyarylates, polyetheretherketone (PEEK) and poly(oxy-1,4-phenylsulfonyl-1,4-phenyl) (PES). In a particularly preferred manner, this includes polyamideimides (PAI), polyesterimide, epoxy resins (EP), phenol resin, polybenzimidazole (PBI), silicone resin, refractory thermoplastics, in particular having a melting point above 220° C. Polyarylates and poly(oxy-1,4-phenylsulfonyl-1,4-phenyl) (PES).

The sliding element according to an aspect of the invention has a metal substrate layer and a coating which is applied thereto and which comprises at least one anti-friction lacquer of the type described above.

The thicknesses of the cross-linked anti-friction lacquer layers in the completed sliding element are advantageously between 1 and 50 In this instance, the thickness, as conventional for sliding elements, is adapted to the component size, that is to say, thicknesses of from 5 to 25 μm are particularly preferred for bearings having diameters up to 130 mm. Below 5 the ability to adapt is lost and above 25 μm the durability of the layer decreases significantly. With large bearings having a diameter of above 130 mm, nonetheless, layer thicknesses of the anti-friction lacquer layers of up to 50 μm are acceptable since in these an increased run-in wear as a result of geometry errors or larger tolerance ranges may be anticipated.

The exposed surface of the metal substrate layer which is provided with the coating preferably has a roughness of $R_z=1$ to 10 μm, in a particularly preferred manner $R_z$=from 3 to 8 μm. In this range, on the one hand, an improved bonding was determined and, on the other hand, the rough surface leads with partial wear of the coating to initially only the tips, that is to say, very small surface portions of the metal substrate layer being exposed, which increases the load-bearing capacity of the surface without simultaneously having the susceptibility to fretting of larger exposed regions of the metal substrate.

The required roughnesses can be produced by mechanical methods, such as sand blasting or grinding, but also chemically by means of phosphating or etching. In addition to the irregular roughnesses, regular substrate structures which can be produced, for instance, by means of drilling, reaming or stamping, are also advantageous.

Blasting with hard particles has been found to be particularly advantageous. It is assumed that, as a result of small particle residues in the surface, an additional improvement of the wear resistance can be achieved when the bearing metal is locally exposed by means of adaptation effects or wear of the lacquer layer caused for other reasons.

The metal substrate layer may itself comprise an individual metal layer (solid material) or may comprise a layered composite (composite material) as a result of a plurality of functionally different metal layers. The exposed layer of the substrate layer to which the coating of the anti-friction lacquer is applied may therefore be formed from different metals or metal alloys, in particular a Cu, Al, Ni, Sn, Zn, Ag, Au, Bi or Fe alloy.

The metal substrate layer may in a composite material comprise a steel support layer or a metal bearing metal layer or a steel support layer and a metal bearing metal layer, optionally a metal intermediate layer and optionally a (thin) metal covering or sliding layer. Both the steel support layer and the bearing metal layer may, depending on the required properties, in particular the strength, be present individually in combination in the substrate layer or form the substrate layer.

If a sliding layer forms the exposed layer of the substrate layer, the coating of the anti-friction lacquer is preferably constructed as a run-in layer for adaptation or conditioning of the counter-movement member in a radial bearing of the shaft material.

A "run-in layer for conditioning a counter-movement member" in the context of this teaching requires at least the addition of hard materials of at least 0.5% by weight with respect to the cured anti-friction lacquer layer.

A "run-in layer for adaptation" in the context of this teaching is obtained without additional hard materials, for example, by increasing the content of lubricants or reducing the proportion of binder, based on the composition of the actual sliding layer.

Both run-in layers preferably have a layer thickness of from 1 to 5 μm and may in a particularly advantageous manner be based on highly durable sputtering layers, in particular those based on AlSn. However, run-in layers are also advantageous on galvanic sliding layers, particularly if the surface of the counter-movement member is particularly aggressive.

If the bearing metal layer forms the exposed metal layer, to which the coating of anti-friction lacquer is applied, the coating of the anti-friction lacquer is preferably constructed as an independent sliding layer with a long service-life. A "sliding layer with a long "service-lift" requires in the context of this teaching at least a layer thickness between 5 and 25 μm. The service-life layer should last as long as possible. To this end, it requires a degree of wear resistance and adequate thickness.

The use of the coating as a sliding layer on CuSn, CuNiSi, CuZn, CuSnZn, AlSn, AlSi, AlSnSi, AlZn bearing metal alloys is advantageous.

According to an advantageous development, the metal substrate layer of the sliding element has an intermediate layer, preferably of Sn, Ni, Ag, Cu, Fe or the alloys thereof on the steel support layer or, if present, on the bearing metal layer, on which intermediate layer either the covering or sliding layer or directly the coating of the anti-friction lacquer is constructed. In the latter case, the intermediate layer forms the exposed layer of the substrate layer. In a particularly preferred manner, intermediate layers are of Ni or Ag and the alloys thereof.

The intermediate layer is optional and serves to improve the bonding and/or sliding properties if the coating and, if present, the covering or sliding layer should become completely worn. The intermediate layer may itself be constructed from one or more individual layers, for example, from a combination of an Ni and an NiSn layer.

A particular embodiment of the invention makes provision for the coating to be a multi-layered system of at least two anti-friction lacquers, of which at least one anti-friction lacquer is constructed in accordance with the method described above, wherein the anti-friction lacquers are configured in such a manner that an upper anti-friction lacquer layer is constructed as a run-in layer for conditioning a counter-movement member on a lower anti-friction lacquer layer which is constructed as a sliding layer with a long service-life.

An alternative multi-layered system according to this invention is constructed in such a manner that, below an upper anti-friction lacquer layer as a sliding layer with good sliding and adaptation properties, a lower anti-friction lacquer layer as a sliding layer with high wear resistance is constructed.

A "sliding layer with good sliding and adaptation properties" in the context of this teaching requires at least the addition of solid lubricants of a total of from 30 to 60% by vol. with respect to the cured anti-friction lacquer layer and a layer thickness between 1 and 10 µm. The proportion of the mixed-phase oxides is rather low or not present. In this instance, therefore, this firstly involves optimising the sliding properties, that is to say, reducing the friction and increasing the adaptability and embeddability, to which the mechanical resilience is also adapted.

A "sliding layer with a high wear-resistance" in the context of this teaching has the objective of further increasing the operational reliability of the sliding element or bearing by it being optimised with particular regard to the wear resistance thereof and thus delaying a complete wearing down to the bearing metal. It also contains for this purpose mixed-phase oxides. The sliding layer with a high wear resistance is similar to the service-life layer with regard to the content of mixed-phase oxides, but in the latter the thickness thereof, which also determines the service-life, is also an important factor.

A multi-layered system may also be constructed in such a manner that below the service-life layer there is also applied an additional anti-friction layer which further increases the operational reliability of the bearing in that it is optimised with particular regard to the wear resistance thereof and thus delays complete wearing down to the bearing metal. To this end, mixed-phase oxides can optionally be added.

Another sliding element having a multi-layered system according to this invention makes provision for the coating to comprise at least two anti-friction lacquers, of which at least one anti-friction lacquer is constructed in accordance with the method described above, wherein an additional lower anti-friction lacquer layer which contains few or no additives at all is arranged between the metal substrate and an upper anti-friction lacquer layer which is constructed as a sliding layer with good sliding and adaptation properties or as a sliding layer with a high degree of wear resistance or as a sliding layer with a long service-life.

An "anti-friction lacquer layer which contains few or no additives at all" in the context of this teaching requires the following steps, that the proportion of the functional fillers is from 0 to 25% by vol. with respect to the cured anti-friction lacquer. This layer is optimised with respect to bonding to the substrate and has, similarly to a primer, the purpose of improving the bonding of the anti-friction lacquer coating located above. This anti-friction lacquer layer which contains few or no additives at all is additionally preferably thinner than the anti-friction lacquer layer above and in a particularly preferred manner only from 0.5 to 5 µm thick.

Accordingly, the coating of the sliding element is preferably a multi-layered system comprising at least two anti-friction lacquers, of which at least one anti-friction lacquer is constructed in accordance with the method described above, wherein the anti-friction lacquers have different proportions at least with regard to one substance selected from the group comprising mixed-phase oxides, solid lubricants, hard materials and materials which improve the thermal conductivity depending on the application.

In contrast to multi-layered systems with discrete layers of anti-friction lacquers, a development of the invention makes provision for a sliding element having a coating comprising a gradient layer system. The gradient layer system comprises at least two anti-friction lacquers, of which at least one anti-friction lacquer is constructed in accordance with the method described above, wherein when viewed over at least a portion of the layer thickness at least one substance selected from the group comprising mixed-phase oxides, solid lubricants, hard materials and materials which improve the thermal conductivity depending on the application has an increasing or decreasing proportion.

In a particularly preferred manner, the above-described sliding elements, constructed as a plain bearing shell or bush (as connection rod bearings or crankshaft bearings) are used in an internal combustion engine. The anti-friction lacquer is also suitable directly as a coating in the internal combustion engine, for example, for the pistons as a shroud coating, or the piston rings as an anti-microwelding flank coating.

THE DRAWINGS

Other features, advantages and applications are explained in greater detail below with reference to embodiments and the Figures. In the Figures:

FIG. 1 is a schematic layered structure of a sliding element according to a first embodiment of the invention;

FIG. 2 is a schematic layered structure of a sliding element according to a second embodiment of the invention;

FIG. 3 is a schematic layered structure of a sliding element according to a third embodiment of the invention;

FIG. 4 is a schematic layered structure of a sliding element according to a fourth embodiment of the invention, and FIG. 5 is a schematic layered structure of a sliding element according to a fifth embodiment of the invention.

DETAILED DESCRIPTION

All the embodiments have a metal substrate layer 11, 21, 31, 41, 51 and a coating 12, 22, 32, 42, 52 which is applied thereto and which comprises at least one anti-friction lacquer according to the invention, wherein the inner structure of the substrate layer and/or the coating vary. The thickness of the coating is between 1 and 50 µm, wherein the schematic illustrations depict the real layer thickness relationships neither precisely nor in a proportionally correct manner, but instead merely to illustrate the sequence of the layers.

The metal substrate layer 11 of the sliding element according to FIG. 1 has a support layer 13, generally of steel, and a bearing metal 14, in most cases based on a Cu or Al alloy, and an intermediate layer 15, which itself may be constructed from one or more individual layers and which can be used to improve the bonding between the bearing metal layer and the coating 12. Depending on the application, the intermediate layer may also be configured in such a manner that, in the event of wear of the layer above, it has improved sliding or emergency running properties. The coating 12 comprises in this embodiment an individual layer 16 of the anti-friction lacquer according to the invention.

In principle, with adequate strength of the bearing metal in this embodiment and the following embodiments the support layer of steel can be dispensed with. Also under some application conditions, the bearing metal layer may also be dispensable. The intermediate layer is also optional, as some of the following embodiments show.

In FIG. 2, the metal substrate layer 21 of the sliding element again comprises a steel support layer 23 and a bearing metal layer 24 to which the coating 22 is applied, this time without an intermediate layer, again in the form of an individual layer 26 of the anti-friction lacquer according to the invention.

The embodiment according to FIG. 3 has a metal substrate layer 31, which comprises a steel support layer 33, a bearing metal layer 34, an intermediate layer 35 and a thin metal sliding or covering layer 37 which is applied thereto. The sliding or covering layer 37 is sputtered on the intermediate layer 35 or galvanically deposited at that location. In this instance, the intermediate layer 35 serves to improve the bonding of the metal sliding or covering layer 37 to the bearing metal layer 34. The coating 32 is applied in the form of an individual layer 36 of the anti-friction lacquer according to the invention to the sliding layer 37 and acts as a run-in layer. It is possible to use as a run-in layer both a lacquer composition which is optimised for conditioning the counter-movement member and a lacquer composition which is optimised in terms of adaptation.

FIG. 4 shows an embodiment having a metal substrate layer 41 which comprises a steel support layer 43 and a bearing metal layer 44. There is arranged thereon the coating 42 in the form of a multi-layered system comprising at least two anti-friction lacquers, of which at least one anti-friction lacquer is constructed according to the invention. The coating 42 specifically has an upper anti-friction lacquer layer 46 which is constructed as a run-in layer and below this an anti-friction lacquer layer 48 which is in contact with the metal substrate 41 and which is constructed as a sliding layer with a long service-life. The service-life anti-friction lacquer layer 48 comprises the anti-friction lacquer according to the invention with mixed-phase oxides, the run-in layer 46 which is applied thereto may optionally contain these. It is also possible to use here as a run-in layer a lacquer composition which is optimised for the conditioning of the counter-movement member, or a lacquer composition which is optimised with regard to the adaptation.

Finally, FIG. 5 shows an embodiment having a metal substrate layer 51 which comprises a steel support layer 53 and a bearing metal layer 54. There is arranged thereon the coating 52 in the form of a multi-layered system comprising at least two anti-friction lacquers, of which at least one anti-friction lacquer is constructed according to the invention. The coating 52 has on the metal substrate 51 a lower anti-friction lacquer layer 58 and on top of this an upper anti-friction lacquer layer 56. The upper anti-friction lacquer layer 56 forms a sliding layer with good sliding and adaptation properties or a sliding layer with a long service-life and contains the mixed-phase oxides. The lower anti-friction lacquer layer is optimised in terms of the bonding to the substrate and has, similarly to a primer, the purpose of improving the bonding of the anti-friction lacquer located above and may optionally contain the mixed-phase oxides.

EXAMPLES

The following Table 1 sets out some example compositions of the anti-friction lacquer according to the invention.

TABLE 1

| Matrix polymer | Additional fillers | Metal phase oxides |
| --- | --- | --- |
| PAI | hBN/SiC | Co—Al oxide |
| PAI | BaSO$_4$/ZnS/hBN/SiC | Ni—Sb—Ti oxide |
| PAI | MoS$_2$ | Fe—Al oxide |
| PAI | PTFE/hBN/MOS$_2$ | Ni—Sb—Ti oxide |
| PI | MoS$_2$/BaSO$_4$/ZnS | Co—Ti—Ni—Zn oxide |
| PI | PTFE/Si$_3$N$_4$ | Co—Al oxide |
| PEI | MoS$_2$ | Co—Ti—Ni—Zn oxide |

The exposed layers of the substrate comprise, for example, the alloys set out in Table 2 and have the associated function in each case of the sliding element

TABLE 2

| | |
| --- | --- |
| CuNi2Si | Bearing metal |
| CuSn8Ni | Bearing metal |
| CuSn6Bi3 | Bearing metal |
| CuPb23Sn | Bearing metal |
| Ni | Intermediate layer |
| AlSn20CuMn | Bearing metal and sliding layer |
| AlSn8Ni2MnCu | Bearing metal and sliding layer |
| AlNi2MnCu | Bearing metal and sliding layer |
| AlSn10Si3CuCr | Bearing metal and sliding layer |
| AlSn6Si4CuNiCr | Bearing metal and sliding layer |
| AlZn5Mg3Cu | Bearing metal |
| AlZnMgCu1.5 | Bearing metal |
| AlSn20 | Bearing metal and sliding layer |
| AlCu4MgSi | Bearing metal |
| AlSi10Cu | Bearing metal |
| Sn, galvanic or vpd | Sliding layer |
| SnCu6, galvanic or vpd | Sliding layer |
| Bi, galvanic or vpd | Sliding layer |
| BiCu3, galvanic or vpd | Sliding layer |
| Ag, galvanic or vpd | Sliding or intermediate layer |

Obviously, many modifications and variations of the present invention are possible in light of the above teachings. It is, therefore, to be understood that the invention may be practiced otherwise than as specifically described while still being within the scope of the invention.

What is claimed is:

1. A sliding element, comprising:
   a metal substrate layer; and
   a coating which is applied thereto and which comprises at least one anti-friction cured lacquer layer of a polymer resin matrix containing functional fillers in the form of mixed-phase oxides having a Rosiwal grinding hardness of below 55 and present at a proportion of 0.1 to 15% by volume of the cured lacquer layer; wherein the mixed-phase oxides have a D50 mean particle size in the range of 0.05 to 2.0 µm; wherein the metal substrate layer comprises a metal support layer or a metal bearing layer or a steel support layer and a metal bearing layer, wherein the coating is applied to an exposed layer of the substrate layer formed of Cu, Al, Ni, Sn, Zn, Ag, Au, Bi or Fe alloy.

2. The sliding element according to claim 1, including a sliding layer that forms the exposed layer of the substrate layer, on which the coating is constructed as a run-in layer for conditioning a counter-movement member or as a run-in layer for adaptation, the sliding layer being constructed as a sputter layer of AlSn, or as a galvanic sliding layer.

3. The sliding element according to claim 1, wherein the bearing metal layer forms the exposed layer of the substrate layer, on which the coating is constructed as a sliding layer.

4. The sliding element according to claim 1, including an intermediate layer of Sn, Ni, Ag, Cu, Fe or the alloys thereof forming the exposed layer of the substrate layer on which the coating is constructed.

5. The sliding element according to claim 1, wherein the coating is a multi-layered system of at least two anti-friction lacquers wherein an upper anti-friction lacquer layer is constructed as a run-in layer for conditioning a counter-movement member on a lower anti-friction lacquer layer as a sliding layer with along service-life, or in that the coating is a multi-layered system of at least two anti-friction lacquers, of which at least one anti-friction lacquer is constructed according to claim 1 wherein below an upper anti-friction lacquer layer as a sliding layer with good sliding and adaptation properties a lower anti-friction lacquer layer with a high wear resistance is constructed.

6. The sliding element according to claim 1, wherein the coating is a multi-layered system comprising at least two anti-friction lacquers, of which at least one anti-friction lacquer is constructed according to claim 1, wherein between the metal substrate layer and an upper anti-friction lacquer layer which is constructed as a sliding layer with good sliding and adaptation properties or as a sliding layer with a high degree of wear resistance, an additional anti-friction lacquer layer which has a few or no additives at all is arranged.

7. The sliding element according to claim 1, wherein the coating is a multi-layered system comprising at least two anti-friction lacquers, of which at least one anti-friction lacquer is constructed according to claim 1, wherein the at least two anti-friction lacquers have different proportions at least with respect to a substance selected from the group comprising mixed phase-oxides, solid lubricants, hard materials and materials which improve the thermal conductivity, or in that the coating is a gradient layer system comprising at least two anti-friction lacquers, of which at least one anti-friction lacquer is constructed according to claim 1, wherein the gradient layer system when viewed over at least a portion of the layer thickness has at least one substance selected from the group comprising mixed phase-oxides, solid lubricant, hard materials and materials which improved the thermal conductivity in an increasing or decreasing proportion.

8. An anti-friction lacquer comprising as a resin matrix of a polymer, and including functional fillers provided in the matrix comprising mixed-phase oxides having Rosiwal grinding hardness of below 55 and present at a proportion of 0.1% to 15% by volume of the lacquer, wherein the mixed-phase oxides have a D50 mean particle size in the range of 0.05 to 2.0 µm.

9. The anti-friction lacquer according to claim 8, wherein the mixed-phase oxides contain at least two of the elements titanium, cobalt, aluminum, nickel, antimony, chromium, iron or zinc, wherein the mixed-phase oxides are formed from titanium and at least two of the elements cobalt, aluminum, nickel, antimony, chromium, iron or zinc and particularly preferred from titanium, nickel and antimony and wherein the mixed-phase oxides are present in the form of rutile, spinel or hematite structures.

10. The anti-friction lacquer according to claim 8, including additional functional fillers which contain one or more of the materials solid lubricants, hard materials and materials which improve the thermal conductivity, and in that the entire proportion of the functional fillers does not exceed 70% with respect to the cured anti-friction lacquer.

11. The anti-friction lacquer according to claim 10, wherein the solid lubricants contain one or more of the materials metal sulphides having a layered structure, in particular $MoS_2$, $WS_2$, $SnS_2$, graphite, hexagonal BN, polytetrafluoroethylene (PTFE), ZnS, $BaSO_4$ and admixtures thereof.

12. The anti-friction lacquer according to claim 10, wherein the hard materials contain, in a proportion not greater than 10% by vol, with respect to the cured anti-friction lacquer, one or more of the materials nitrides, carbides, borides, oxides, in particular SiC, $Si_3N_4$, $B_4C_3$, cubic NN or $SiO_2$.

13. The anti-friction layer according to claim 12, wherein the proportion not greater than 5% by vol.

14. The anti-friction lacquer according to claim 10, wherein the materials which improve the thermal conductivity contain, in a proportion not greater than 30% by vol. with respect to the cured anti-friction lacquer, one of more metal powders form the group comprising Ag, Pb, Au, SN, Al, Bi or Cu.

15. The anti-friction lacquer according to claim 8, wherein the polymer is selected from the group comprising polyimides (PI), polyamideimides (PAI), polyetherimides (PEI) and polyesterimide, epoxy resins (EP), phenol resin, polybenzimidazole (PBI), silicone resin, refractory thermoplastics having a melting pint above 220° C., polyarylates, polyetheretherketone (PEEK) and poly (oxy-1,4-phenylsulfonyl-1,4-phenyl) (PES).

16. The anti-friction lacquer according to claim 8, including additional functional fillers.

17. The anti-friction lacquer according to claim 8, wherein the proportion is 0.5 to 8% by vol.

18. The anti-friction lacquer according to claim 8, wherein the range is 0.1 to 0.5 µm.

\* \* \* \* \*